(12) United States Patent
Willgert et al.

(10) Patent No.: US 11,134,609 B2
(45) Date of Patent: Oct. 5, 2021

(54) ROBOTIC WORK TOOL AND METHOD FOR DETECTING TOOL DAMAGE OR LOSS

(71) Applicant: HUSQVARNA AB, Huskvarna (SE)

(72) Inventors: Mikael Willgert, Spånga (SE); Patrik Jägenstedt, Tenhult (SE); Olle Markusson, Bankeryd (SE); Fredrik Kallström, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 453 days.

(21) Appl. No.: 15/537,509

(22) PCT Filed: Nov. 26, 2015

(86) PCT No.: PCT/EP2015/077850
§ 371 (c)(1),
(2) Date: Jun. 19, 2017

(87) PCT Pub. No.: WO2016/102145
PCT Pub. Date: Jun. 30, 2016

(65) Prior Publication Data
US 2018/0263181 A1    Sep. 20, 2018

(30) Foreign Application Priority Data

Dec. 23, 2014   (SE) .................... 1451646-2

(51) Int. Cl.
| | | |
|---|---|---|
| *A01D 34/00* | (2006.01) | |
| *G07C 5/00* | (2006.01) | |
| *G07C 5/08* | (2006.01) | |
| *A01D 69/02* | (2006.01) | |
| *A01D 101/00* | (2006.01) | |

(52) U.S. Cl.
CPC ........... *A01D 34/008* (2013.01); *G07C 5/006* (2013.01); *G07C 5/085* (2013.01); *A01D 69/02* (2013.01);
(Continued)

(58) Field of Classification Search
CPC ............... A01D 34/008; A01D 34/006; G05D 2201/0208; G07C 5/006; G07C 5/085
See application file for complete search history.

(56) References Cited

U.S. PATENT DOCUMENTS

| | | | |
|---|---|---|---|
| 5,204,814 A * | 4/1993 | Noonan ............... | G05D 1/0274 701/25 |
| 2002/0107625 A1 | 8/2002 | Beck et al. | |

(Continued)

FOREIGN PATENT DOCUMENTS

| | | | |
|---|---|---|---|
| CN | 202443328 U | 9/2012 | |
| DE | 102011117258 A1 * | 5/2013 | ........... A01D 34/828 |

(Continued)

OTHER PUBLICATIONS

International Search Report and Written Opinion for International Application No. PCT/EP2015/077850 dated Feb. 5, 2016.

(Continued)

*Primary Examiner* — Alicia Torres
(74) *Attorney, Agent, or Firm* — Burr & Forman, LLP

(57) ABSTRACT

A robotic work tool comprising a work tool (160), a tool damage detector (162) and a controller (110) for controlling the operation of the robotic work tool (100), the robotic work tool (100) being configured to detect that the work tool (100) is damaged or lost by detecting an irregularity utilizing the tool damage detector (162) and thereby determining that the work tool (160) is damaged or lost.

14 Claims, 3 Drawing Sheets

(52) U.S. Cl.
CPC . *A01D 2101/00* (2013.01); *G05D 2201/0208* (2013.01)

(56) References Cited

U.S. PATENT DOCUMENTS

| | | | | |
|---|---|---|---|---|
| 2002/0156556 | A1* | 10/2002 | Ruffner | A01D 34/008 701/23 |
| 2003/0144774 | A1 | 7/2003 | Trissel et al. | |
| 2008/0161968 | A1* | 7/2008 | Adegbile | A01D 34/008 700/245 |
| 2009/0237227 | A1* | 9/2009 | Ehrhart | A01D 34/664 340/441 |
| 2010/0294097 | A1* | 11/2010 | Aoki | A01D 34/828 83/58 |
| 2013/0042591 | A1* | 2/2013 | Behnke | A01F 29/095 56/10.2 A |
| 2014/0116017 | A1 | 5/2014 | Hunt et al. | |

FOREIGN PATENT DOCUMENTS

| | | |
|---|---|---|
| DE | 102011117258 A1 | 5/2013 |
| EP | 2767150 A1 | 8/2014 |
| WO | 2014129941 A1 | 8/2014 |

OTHER PUBLICATIONS

International Preliminary Report on Patentability for International Application No. PCT/EP2015/077850 dated Jun. 27, 2017.

\* cited by examiner

ROBOTIC WORK TOOL AND METHOD FOR DETECTING TOOL DAMAGE OR LOSS

TECHNICAL FIELD

This application relates to a method, a robotic work tool system, a robotic work tool and a computer-readable storage medium for an improved navigation for a robotic work tool.

BACKGROUND

Lawnmower robots are equipped with grass cutting tools, such as blades. As the lawnmower robots work outside they come in contact with stones, rocks, wood and debris of all sorts. As such, they run a risk of being damaged if they should hit such an object. When a grass cutting device gets damaged it needs to be replaced to ensure proper operation. There is also a risk that the lawnmower robot is further damaged as the damaged cutting tool is rotated at high speeds. Also, these blades are often sharp and it would be beneficial if they were found easily to prevent injuries to children and pets playing in a garden being serviced by the lawnmower robot. Also, the blades or other cutting devices may be repaired. It would therefore be beneficial if they could be located easily.

Furthermore, if the damage is not major, it may take time to notice that the operation of the robotic work tool provides a reduced effect. In other words, it may take time to notice that the grass is not cut as well as it should.

Even if the problems have been discussed with reference to lawnmower robots, other robotic work tools also suffer from similar problems.

There is thus a need for a manner of detecting when a work tool is damaged.

SUMMARY

It is an object of the teachings of this application to overcome the problems listed above by providing a robotic work tool comprising a work tool, a tool damage detector and a controller for controlling the operation of the robotic work tool, the robotic work tool being configured to detect that the work tool is damaged or lost by detecting an irregularity utilizing the tool damage detector and thereby determining that the work tool is damaged or lost.

In one embodiment the controller is further configured to note a current position when it is determined that the work tool is damaged or lost.

In one embodiment the controller is further configured to discontinue operation. In one embodiment the controller is further configured to determine that the operation should be discontinued if sensed vibrations are above a vibration threshold and/or the load exerted on a driving shaft is below a load threshold.

In one embodiment the controller is further configured to return to a servicing station. In one embodiment the controller is further configured to return to the position where the damage was detected. In one embodiment the controller is further configured to provide an indication, such as the coordinates, for the position where the damage was detected through a user interface or a communication interface also comprised in the robotic work tool.

In one embodiment the controller is further configured to stop at the position where the damage was detected.

In one embodiment the tool damage detector is configured to sense vibrations in the robotic work tool as a whole, on a shaft driving the work tool, and/or on the work tool motor, and if the vibrations increase above a threshold or at a change rate above a threshold, the robotic work tool determines that the work tool is damaged or lost.

In one embodiment the tool damage detector is configured to sense audible noise, wherein noise above a threshold indicates that the work tool is damaged or lost.

In one embodiment the tool damage detector is configured to detect a change in weight of the robotic work tool or the weight exerted on a shaft driving the work tool.

In one embodiment the tool damage detector is configured to detect a change in balance of the robotic work tool or the balance of a shaft driving the work tool.

In one embodiment the tool damage detector is configured to sense the load exerted on the work tool, wherein a decline in load below a threshold level, or a sudden decline which is maintained, indicates that the work tool is lost or damaged.

In one embodiment the robotic work tool is a lawnmower robot, the work tool is a grass cutting device, and the operation is a mowing operation.

It is also an object of the teachings of this application to overcome the problems listed above by providing a robotic work tool system comprising a charging station and a robotic work tool according to any preceding claim.

It is also an object of the teachings of this application to overcome the problems listed above by providing a method for use in robotic work tool comprising a work tool and a tool damage detector, the method comprising detecting that the work tool is damaged or lost by detecting an irregularity utilizing the tool damage detector and thereby determining that the work tool is damaged or lost.

It is also an object of the teachings of this application to overcome the problems listed above by providing a computer readable storage medium encoded with instructions that, when executed on a processor, performs a method according to herein.

The inventors of the present invention have realized, after inventive and insightful reasoning that by sensing vibrations or unbalance it may be detected that a cutting device, or other work tool has been damaged and thereby prevent further damage to the robotic work tool.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
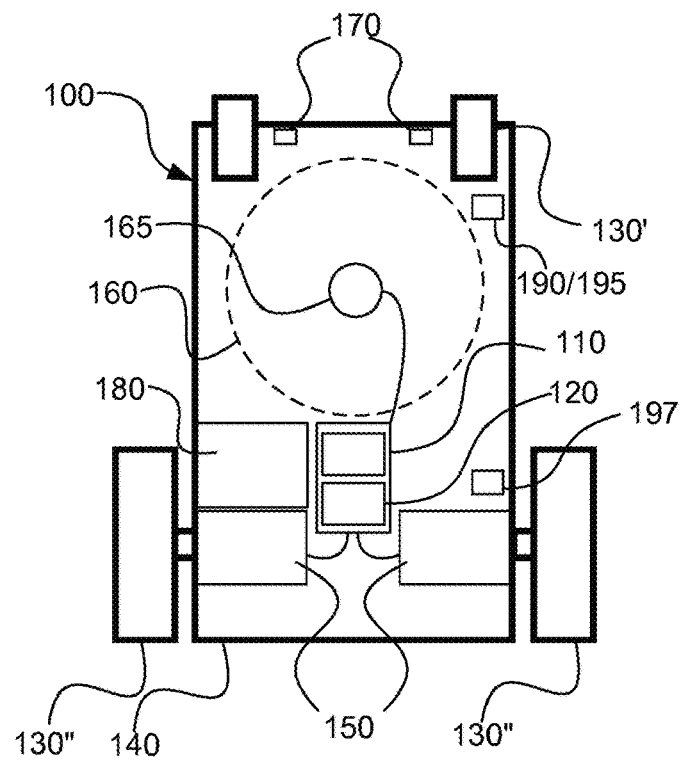
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100 including, but not being limited to, the propulsion of the robotic work tool. The controller 110 may be implemented using any suitable, publicly available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 may further have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is close to or crossing a boundary wire, or inside or outside an area enclosed by the boundary wire.

The robotic work tool 100 also comprises a work tool 160, which may be a grass cutting device, such as a rotating blade 160 driven by a cutter motor 165. The grass cutting device may also or alternatively be a disc carrying one or more grass cutting plates or blades. It should be noted that different kinds of grass cutting devices may be used with the manners taught herein. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic work tool 100 also has (at least) one battery 180 for providing power to the motors 150 and the cutter motor 165. The robotic work tool 100 is, in one embodiment, a lawnmower robot.

The robotic work tool 100 may also be arranged with a position determining device 190, such as a GNSS (Global Navigation Satellite System) device 190. In one embodiment the GNSS device is a GPS (Global Positioning Service) device 190. The GNSS device 190 is connected to the controller 110 for enabling the controller 110 to determine a current position for the robotic work tool 100 using the GNSS device and to control the movements of the robotic work tool 100 based on the position.

The robotic work tool 100 may further be arranged with at least one sensor 195 for providing signals for deduced reckoning navigation, also referred to as dead reckoning. Examples of such deduced reckoning navigation sensors 195 are odometers and compasses.

The robotic work tool 100 may further be arranged with a wireless communication interface 197 for communicating with other devices, such as a server, a personal computer or smartphone or the charging station. Examples of such wireless communication devices are Bluetooth™, Global System Mobile (GSM) and LTE (Long Term Evolution) to name a few.

Figure 2:
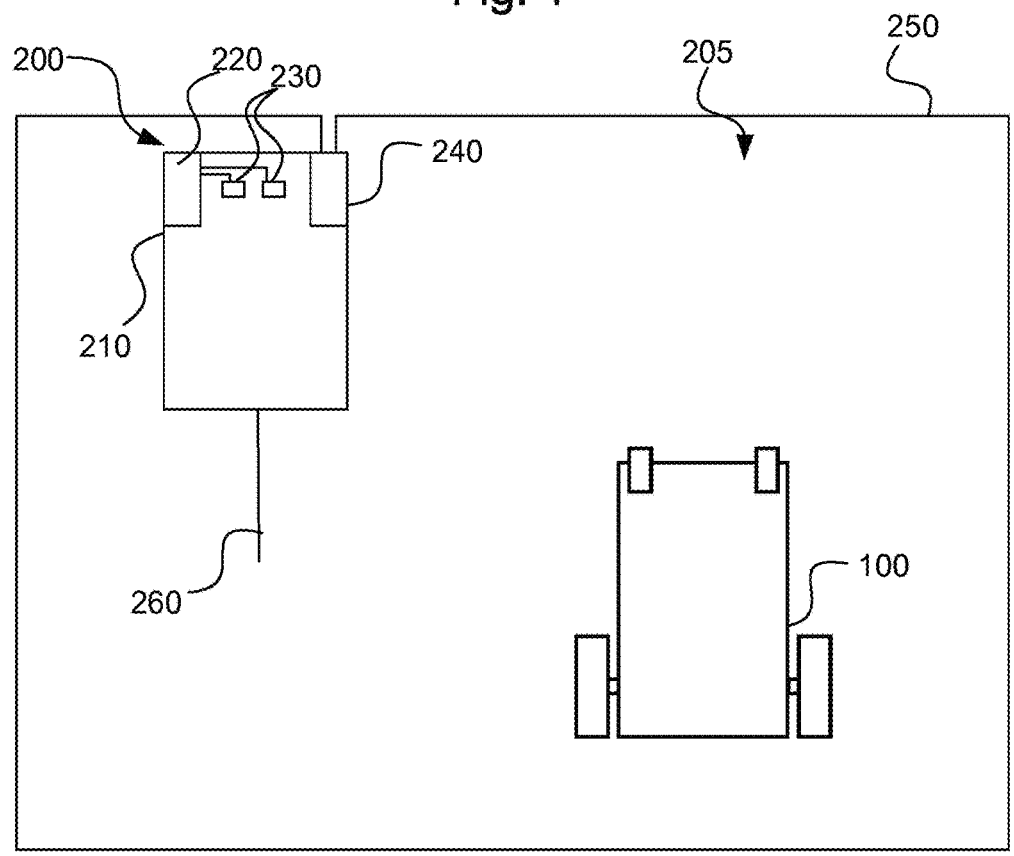
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has a guide cable 260 for enabling the robotic work tool to find the entrance of the charging station 210. In one embodiment the guide cable 260 is formed by a loop of the boundary wire 250. In one embodiment the guide wire 260 is used to generate a magnetic field for enabling the robotic work tool 100 to find the charging station without following a guide cable 260.

Figure 3:
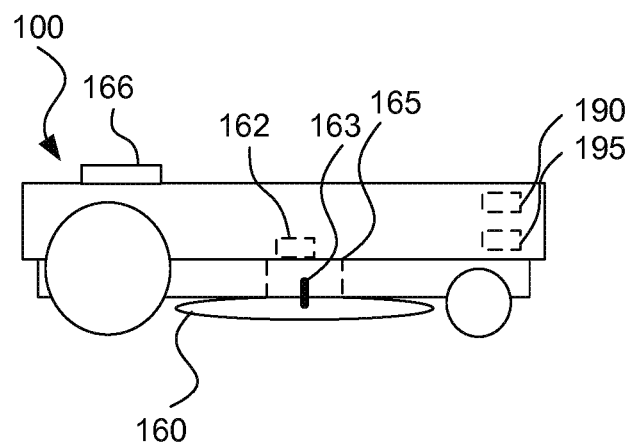
FIG. 3 shows a schematic view of a robotic working tool system in operation according to one embodiment of the teachings of this application.

FIG. 3 shows a schematic side view of a robotic work tool 100 having a work tool 160, such as a grass cutting device. In this example, the grass cutting device is exemplified as a disc, but other variants are also possible and work well with the teachings herein. As has been discussed before, the grass cutting device 160 is driven by a grass cutter motor 165. Also arranged in the robotic work tool 100 is a tool damage detector 162 configured to detect when the tool 160 is damaged.

The tool damage detector may 162 be configured to sense vibrations in the robotic work tool 100 as a whole, on a shaft 163 driving the grass cutting device 160, or on the work tool motor 165, and if the vibrations increase above a threshold or at a change rate above a threshold (sudden changes which are maintained), the robotic work tool 100 may determine that the work tool 160 has suffered a damage.

The tool damage detector 162 may also be configured to sense audible noise indicating that something is damaged.

The tool damage detector 162 may also be configured to detect a change in weight of the robotic work tool or the weight exerted on the shaft 163. A change in weight indicates that something has gone missing, indicating that the work tool 160 is damaged or lost. A sensor for detecting a change in weight may be implemented as part of lift or collision detection means.

The tool damage detector 162 may also be configured to detect a change in balance of the robotic work tool or the balance of the shaft 163. A change in balance indicates that something has gone missing, indicating that the work tool 160 is damaged or lost. A sensor for detecting a change in balance may be implemented as part of lift or collision detection means.

The tool damage detector may be a vibration sensor (possibly implemented as part of a collision or lift detector) arranged to send signals to the controller 110 which then processes the signals to determine if such changes in vibration has occurred.

Such means are designed to detect smaller movements of the cover relative the body of a robotic work tool. Since any vibrations in the work tool 160 would propagate through the body and to the cover, being translated to the cover through the lift/collision detection means, they may also be used to detect such vibrations. Naturally there is always some vibration during operation, especially if the robotic work tool is moving, or is moving over an uneven surface. Should an increase in vibrations be detected, the controller may be configured to arrest or stop the movement of the robot. If the increase in vibrations is still on an increased or heightened level, the robotic work tool may determine that there is damage to the blade(s). The increase in vibration that will trigger a detection may be an absolute value or it may be a relative value compared to the current vibration level, where for example, an increase of 10%, 20%, 30%, 40%, 50% or more will trigger a determination if damage has been detected. The threshold level used will depend on the design of the actual robotic work tool and the arrangement and the sensitivity of the sensor used.

The tool damage detector 162 may also be configured by the controller 110 sensing the load exerted on the work tool 160. The load may be sensed by sensing the actual torque on the shaft 163 or by monitoring the power being used by the tool motor 165. A decline in load below a threshold level, or a sudden decline which is maintained, may indicate that the work tool is lost or damaged. Alternatively a constantly changing (apart from normal smaller deviations/variations) may be indicative that the blade(s) has been damaged.

Also, a sudden increase, possibly repeated, may be indicative that the robotic work tool has come across a hard object which may damage the blade. The robotic work tool may then take action as if a blade(s) was damaged pre-emptively.

In an embodiment having blade(s) that is pivotably arranged to the working tool disc, such as pivoting knife blades arranged on a knife disc, there may be a sensor arranged to detect if the blades are still pivoting, or indeed present. If the blades are not pivoting (over a period of time, for example 1, 2, 3, 4 or 5 seconds), the blade(s) is most likely damaged or gone missing. This could be combined with the measurement of the power load.

A sensor (optic or magnetic) could also be arranged close to the knife disc or work tool 160 and detect any variations in the movement of the disc which would then also be indicative of damaged blade(s).

Alternatively or additionally a sensor (optic or magnetic) could also be arranged close to the drive shaft of the work tool for detecting movements of the shaft off its axis. This could also be indicative of damaged blade(s).

It should be noted that the manners of detecting any variations in balance may be combined.

Any increase or change as discussed above, could be detected as an absolute value or as a relative value. If the change exceeds a threshold level or changes at a rate exceeding a threshold level, the robotic work tool may determine that a blade is (probably) damaged or lost.

Figure 4:
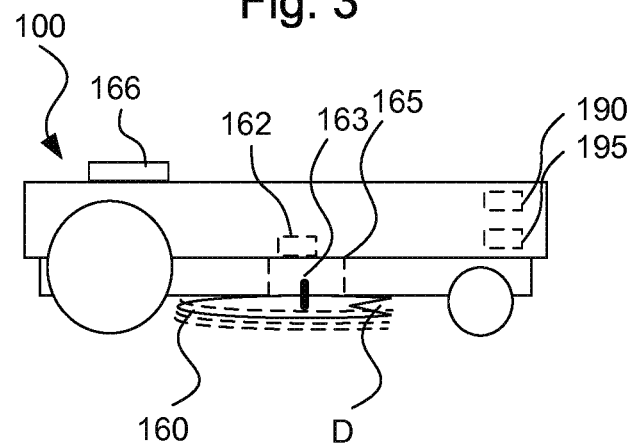
FIG. 4 shows a schematic view of a robotic working tool system in operation according to one embodiment of the teachings of this application.
Figure 5:
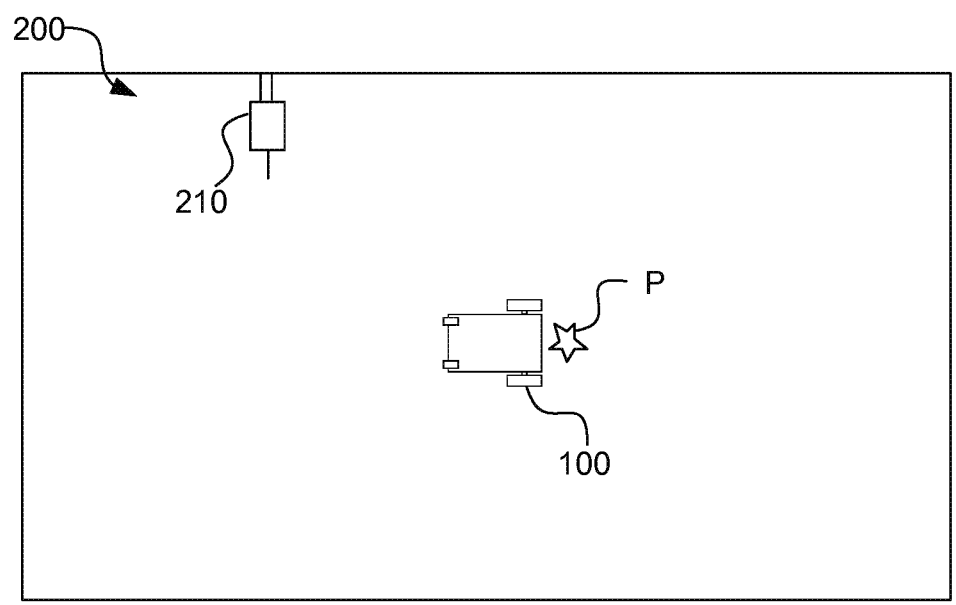
FIG. 5 shows a schematic view of a robotic work tool system according to herein.
Figure 6:
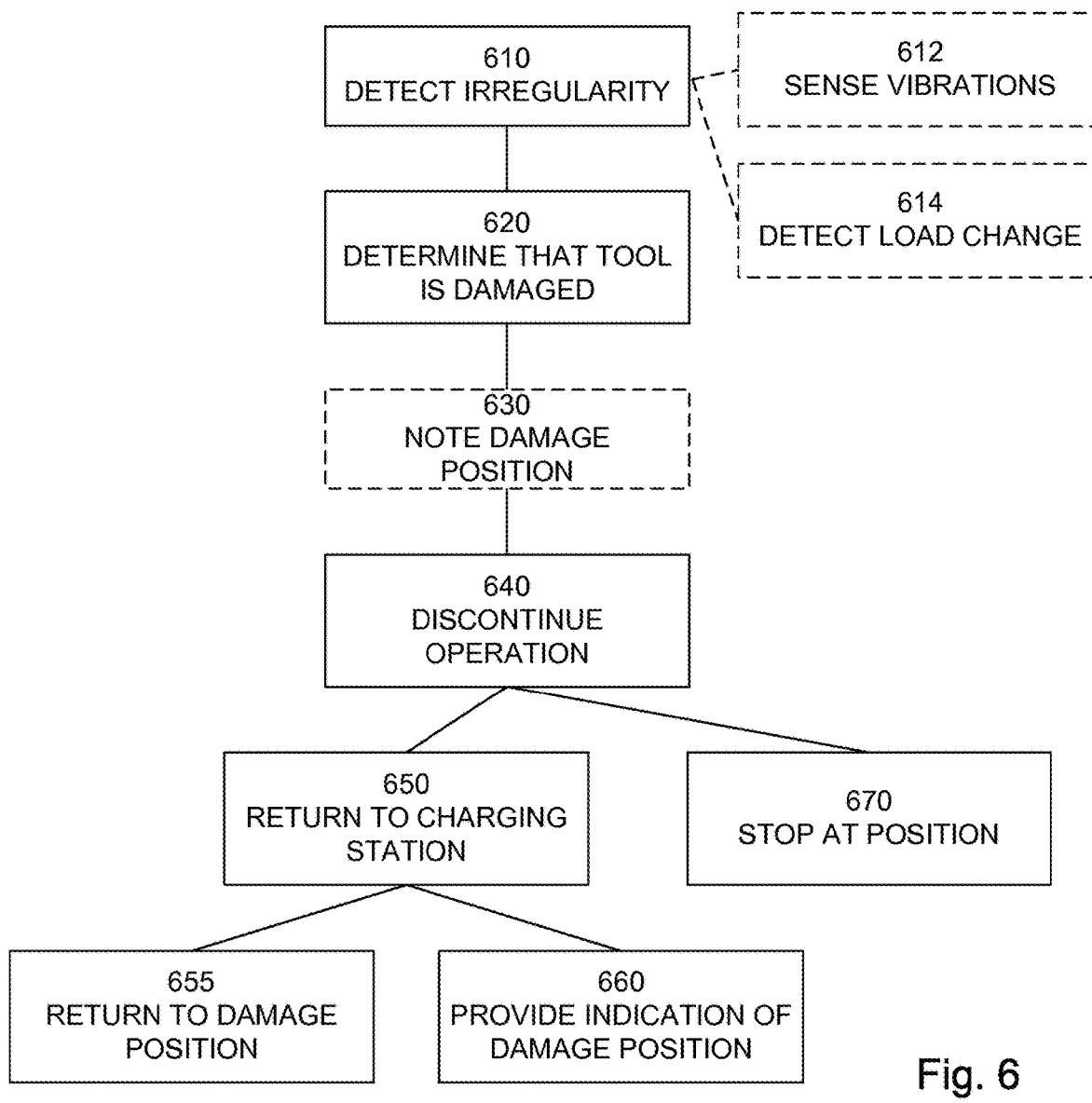
FIG. 6 shows a flowchart for a general method according to herein.

FIG. 4 shows a schematic side view of a robotic work tool 100 with a damaged work tool 100. As is indicated the work tool 160 is vibrating. FIG. 5 shows a schematic view of a robotic work tool system 200 according to herein and FIG. 6 shows a flowchart for a general method according to herein.

The robotic work tool 100 is configured to detect 610 that the work tool 100 is damaged or lost by detecting an irregularity, such as by sensing vibrations, noise, unbalance or weight changes 612 or by sensing or detecting 614 a change in the load exerted on the work tool 160 and thereby detecting that the work tool 160 is damaged or lost 620.

As the robotic work tool 100 detects that the grass cutting device 160 has been damaged or lost, the robotic work tool 100 may be configured to note or record 630 its current position P. The robotic work tool 100 may be configured to determine the position of the robotic work tool 100 using position determining device(s), such as a GNSS device 190 or a deduced reckoning device 195.

The robotic work tool 100 may then be configured to determine that the mowing operation should be discontinued 640. The robotic work tool may be configured to determine that the mowing operation should be discontinued if the sensed vibrations are above a vibration threshold 642 and/or the load exerted is below a load threshold 644. If the robotic work tool 100 determines to discontinue the mowing operation, to reduce the risk of damage to the robotic work tool 100, the robotic work tool 100 may be configured to return 650 to the charging station 210 or other servicing station or to stop 670 at the position P where the damage was detected. If the robotic work tool 100 stops it may signal an error by for example emitting a sound or flashing a light. The robotic work tool 100 may also signal an error to the charging station or to a remote control.

If the robotic work tool 100 has returned to the charging station 210, the robotic work tool 100 may be configured to return 655 to the position P where the damage was detected upon receiving user input (through a user interface 166) or when activated next time if no service has been made. The robotic work tool 100 may also or alternatively be configured to provide an indication 660, such as the coordinates, for the position P where the damage was detected through the user interface 166 or communication interface 197.

In this manner, the robotic work tool may indicate to a user that the cutting device is damaged and possibly needs to be replaced thereby providing a better operation result and preventing further damage to the robotic work tool.

Figure 7:
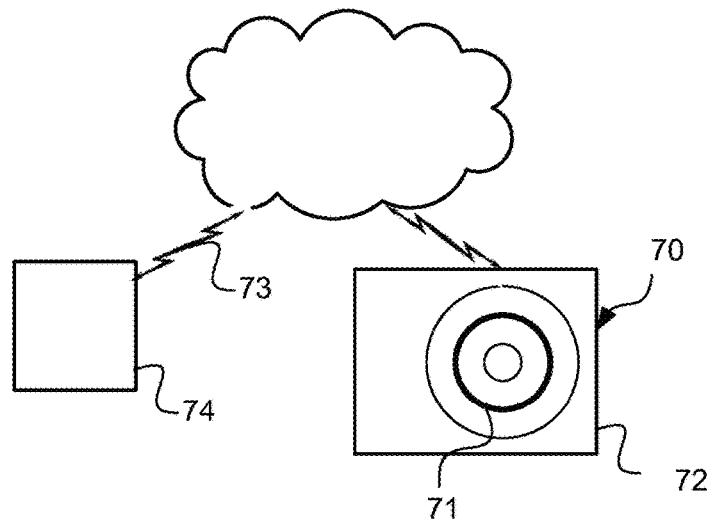
FIG. 7 shows a schematic view of a computer-readable medium according to herein.

FIG. 7 shows a schematic view of a computer-readable medium as described in the above. The computer-readable medium 70 is in this embodiment a data disc 70. In one embodiment the data disc 70 is a magnetic data storage disc. The data disc 70 is configured to carry instructions 71 that when loaded into a controller, such as a processor, executes a method or procedure according to the embodiments disclosed above. The data disc 70 is arranged to be connected to or within and read by a reading device 72, for loading the instructions into the controller. One such example of a reading device 72 in combination with one (or several) data disc(s) 70 is a hard drive. It should be noted that the computer-readable medium can also be other mediums such as compact discs, digital video discs, flash memories or other memory technologies commonly used. In such an embodiment the data disc 70 is one type of a tangible computer-readable medium 70.

The instructions 71 may also be downloaded to a computer data reading device 74, such as the controller 110 or other device capable of reading computer coded data on a computer-readable medium, by comprising the instructions 71 in a computer-readable signal 73 which is transmitted via a wireless (or wired) interface (for example via the Internet) to the computer data reading device 74 for loading the instructions 71 into a controller. In such an embodiment the computer-readable signal 73 is one type of a non-tangible computer-readable medium 70.

The instructions may be stored in a memory (not shown explicitly in FIG. 7, but referenced 120 in FIG. 1) of the computer data reading device 74.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic lawnmower comprising:
   a work tool comprising a grass cutting device;
   a cutter motor coupled to the work tool via a shaft the cutter motor being configured to drive the work tool to cut grass;
   a tool damage detector configured to sense vibrations in the robotic lawnmower and detect a load exerted on the shaft, the load on the shaft being detected based on a measure of power delivered to the cutter motor or by sensing a torque on the shaft; and
   a controller configured to:
   control movement of the robotic lawnmower and a mowing operation of the robotic lawnmower;
   determine that the work tool is damaged or lost based on the vibrations in the robotic lawnmower sensed by the tool damage detector and the load exerted on the shaft by:
   determining that an increase in vibrations over a vibration threshold level is occurring and a decrease in the load exerted on the shaft has occurred,
   causing the robotic lawnmower to arrest or stop movement, and
   determining that the increase in vibrations is present with the movement of the robotic lawnmower arrested or stopped indicating that the work tool is damaged or lost;
   record a position of the robotic lawnmower in response to detecting the damage to or loss of the work tool; and
   discontinue the mowing operation in response to detecting the damage to or loss of the work tool.

2. The robotic lawnmower of claim 1, wherein the controller is further configured to provide an indication including coordinates for the position where the damage or loss of the work tool was detected via a user interface or a communication interface also comprised in the robotic lawnmower.

3. The robotic lawnmower of claim 1, wherein the controller is further configured to cause the robotic lawnmower to return to a servicing station in response to detecting damage or loss of the work tool.

4. The robotic lawnmower of claim 1, wherein the tool damage detector is configured to sense vibrations in the robotic lawnmower as a whole, on the shaft driving the work tool, or on the cutter motor.

5. The robotic lawnmower of claim 1, wherein the tool damage detector is further configured to detect the decrease in the load exerted on the shaft below a threshold load for at least a predetermined duration of time.

6. The robotic lawnmower of claim 1, wherein the tool damage detector is further configured to detect the decrease in the load exerted on the shaft below a threshold load, the threshold load being a threshold rate of decrease of the load exerted on the shaft.

7. The robotic lawnmower of claim 1, wherein controller is further configured to issue an error signal in response to the tool damage detector detecting that the work tool is damaged or lost.

8. A robotic lawnmower comprising:
   a work tool comprising a grass cutting device;
   a tool damage detector configured to sense vibrations in the robotic lawnmower; and
   a controller configured to
   control a mowing operation of the robotic lawnmower,
   determine that the work tool is damaged or lost based on the vibrations in the robotic lawnmower sensed by the tool damage detector by determining that an increase in vibrations over a threshold level is occurring, causing the robotic lawnmower to arrest or stop movement, and determining that the increase in vibrations is present with the movement of the robotic lawnmower arrested or stopped indicating that the work tool is damaged or lost; and
   record a position of the robotic lawnmower in response to determining that the work tool is damaged or lost.

9. The robotic lawnmower of claim 8, wherein the controller is further configured to provide an indication including coordinates for a position where damage or loss of the work tool was detected via a user interface or a communication interface also comprised in the robotic lawnmower.

10. The robotic lawnmower of claim 8, wherein the controller is configured to determine that the increase in the vibrations are over the threshold level for at least a predetermined duration of time.

11. The robotic lawnmower of claim 8, wherein the controller is further configured to determine that the increase in vibrations is over the threshold level, the threshold level being a threshold rate of increase in vibrations.

12. The robotic lawnmower of claim 8, wherein the tool damage detector is configured to sense vibrations in a motor shaft of the work tool.

13. The robotic lawnmower of claim 8, wherein the tool damage detector is configured to sense vibrations in an external cover of the robotic lawnmower.

14. The robotic lawnmower of claim 8, wherein the controller is further configured to determine a position of the robotic lawnmower based at least in part on deduced reckoning navigation.

* * * * *